(12) United States Patent
Adachi et al.

(10) Patent No.: US 11,917,117 B2
(45) Date of Patent: Feb. 27, 2024

(54) PROCESSING SYSTEM, PROCESSING METHOD AND NON-TRANSITORY COMPUTER-READABLE STORAGE MEDIUM

(71) Applicant: CANON KABUSHIKI KAISHA, Tokyo (JP)

(72) Inventors: Daichi Adachi, Tokyo (JP); Hajime Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 259 days.

(21) Appl. No.: 17/471,200

(22) Filed: Sep. 10, 2021

(65) Prior Publication Data

US 2022/0086413 A1 Mar. 17, 2022

(30) Foreign Application Priority Data

Sep. 17, 2020 (JP) ................................. 2020-156622
Apr. 27, 2021 (JP) ................................. 2021-075358

(51) Int. Cl.
  *H04N 13/111* (2018.01)
  *G06T 7/73* (2017.01)
  *H04N 23/69* (2023.01)
  *H04N 23/611* (2023.01)
  *H04N 23/695* (2023.01)

(52) U.S. Cl.
  CPC .............. *H04N 13/111* (2018.05); *G06T 7/73* (2017.01); *H04N 23/611* (2023.01); *H04N 23/69* (2023.01); *H04N 23/695* (2023.01)

(58) Field of Classification Search
  CPC .... H04N 13/111; H04N 23/611; H04N 23/69; H04N 23/695; H04N 23/90; H04N 13/243; G06T 7/73
  USPC ............................................ 348/43; 345/420
  See application file for complete search history.

(56) References Cited

U.S. PATENT DOCUMENTS

| | | | |
|---|---|---|---|
| 10,510,159 B2 | 12/2019 | Adachi et al. | |
| 2010/0245349 A1* | 9/2010 | Gay ..................... | H04N 5/2224 345/173 |
| 2017/0094222 A1* | 3/2017 | Tangeland ............. | H04N 23/51 |
| 2017/0099426 A1* | 4/2017 | Okunami ............... | H04N 7/142 |
| 2021/0168301 A1 | 6/2021 | Iwakiri et al. | |
| 2022/0329770 A1* | 10/2022 | Sugano ................. | G06T 19/003 |

FOREIGN PATENT DOCUMENTS

| | | | |
|---|---|---|---|
| JP | 2006217366 A | * | 8/2006 |
| JP | 2008-015756 A | | 1/2008 |

* cited by examiner

*Primary Examiner* — Thai Q Tran
*Assistant Examiner* — Stephen R Smith
(74) *Attorney, Agent, or Firm* — Carter, DeLuca & Farrell LLP

(57) ABSTRACT a processing system comprises a plurality of image capturing units configured to capture a space including an object and configured to be used for generating a virtual viewpoint image representing a view from a virtual viewpoint; and a presenting unit configured to perform presentation for determining an orientation of the object in the space.

17 Claims, 12 Drawing Sheets

PROCESSING SYSTEM, PROCESSING METHOD AND NON-TRANSITORY COMPUTER-READABLE STORAGE MEDIUM

BACKGROUND

Field

The present disclosure relates to a processing system, a processing method and a non-transitory computer-readable storage medium.

Description of the Related Art

In recent years, a technology has drawn attention in which a plurality of cameras installed at different positions perform synchronous image capturing to generate virtual viewpoint contents using multi-view images obtained by the image capturing. According to such a technique, for example, it is possible to view highlight scenes of soccer or basketball games from various angles, and hence it is possible to give users higher realistic sensations as compared with normal images.

Literature: Japanese Patent Laid-Open No. 2008-015756 discloses a technology in which a plurality of cameras are arranged as surrounding a subject, and an image at any viewpoints is generated using images of an object captured by the plurality of cameras.

There has been a so-called tally (tally lamp or tally light). A tally is a red lamp attached to a television camera, lights up when the equipment is in use, and normally operates with a switcher and the like. The cast (object) can know that he/she is being captured, and hence it can be used to cue lines or actions.

SUMMARY

However, in the system for generating the virtual viewpoint contents described above, there is no real camera (actual camera) at the position of the virtual viewpoint. Therefore, in the case of capturing in a studio, for example, the performer has no idea where to cast the eyes, and thus the performer has some restrictions on the performance.

The present disclosure has been made in view of the above problem, and provides a technology for supporting an object (performer) in capturing an image used for generating a virtual viewpoint image.

According to an aspect of the disclosure, there is provided a processing system comprising:

a plurality of image capturing units configured to capture a space including an object and configured to be used for generating a virtual viewpoint image representing a view from a virtual viewpoint; and a presenting unit configured to perform presentation for determining an orientation of the object in the space.

According to the present disclosure, it is possible to provide a technology for supporting an object (performer) in capturing an image used for generating a virtual viewpoint image.

Further features of the present disclosure will become apparent from the following description of exemplary embodiments with reference to the attached drawings.

DESCRIPTION OF THE EMBODIMENTS

Figure 1:
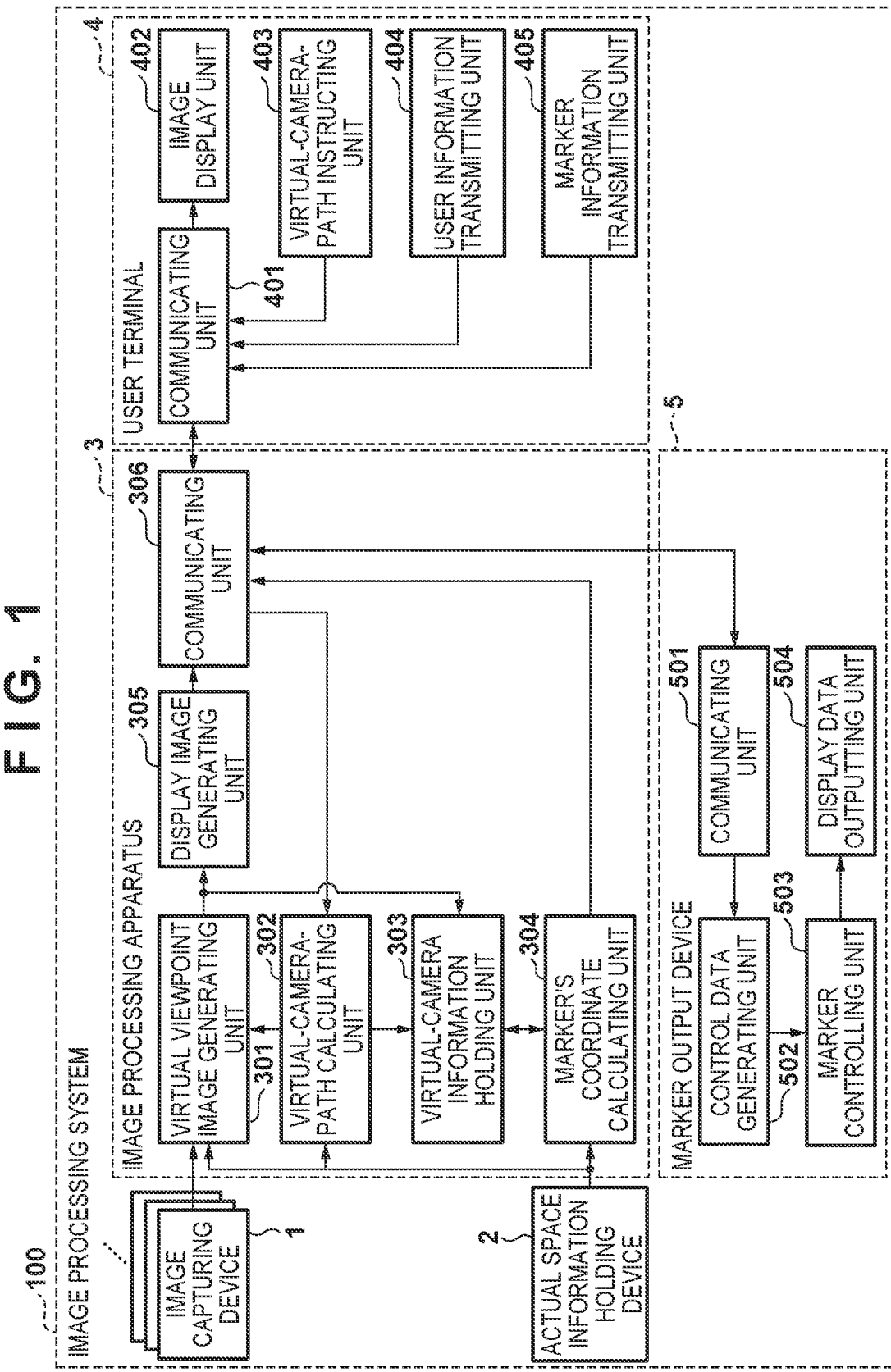
FIG. 1 is an overall configuration view of an image processing system according to a first embodiment.

Hereinafter, embodiments will be described in detail with reference to the attached drawings. Note, the following embodiments are not intended to limit the scope of the invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A system in which a plurality of cameras are installed in facilities such as a stadium, a concert hall, and a studio to capture images will be described with reference to FIG. 1.

FIG. 1 is an overall configuration view of an image processing system 100 to which the first embodiment is applied. The present system 100 includes an image capturing device 1, an actual space information holding device 2, an image processing apparatus 3, a user terminal 4, and a marker output device 5, which are assumed to be connected via a network. The network may be wired or wireless.

Figure 9:
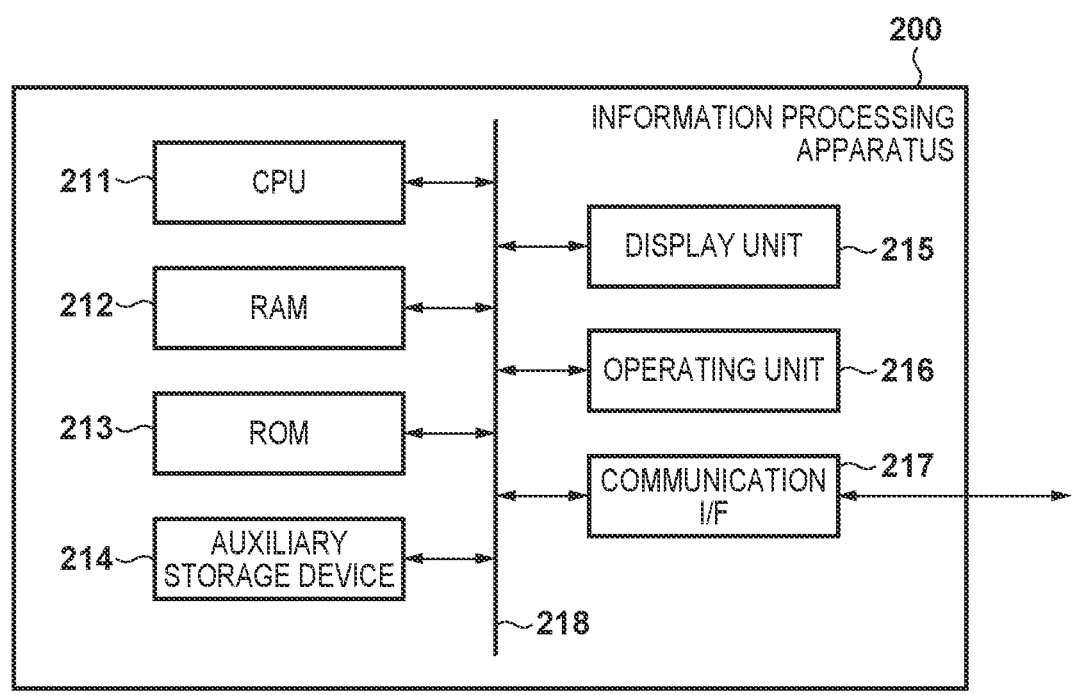
FIG. 9 is a view illustrating a hardware configuration of each device constituting the system of the embodiment.

In the above configuration, the actual space information holding device 2, the image processing apparatus 3, the user terminal 4, and the marker output device 5 can be implemented by an information processing apparatus represented by a personal computer (PC) and an application program executed on the information processing apparatus. FIG. 9 is a hardware block configuration diagram of an information processing apparatus 200. The information processing apparatus 200 includes a CPU 211, a RAM 212, a ROM 213, an auxiliary storage device 214, a display unit 215, an operating unit 216, and a communication interface (I/F) 217, and has a structure in which these are connected to a system bus 218.

When the present apparatus is powered on, the CPU 211 executes a boot program in the ROM 213, loads an operating system (OS) from the auxiliary storage device 214 (e.g., a hard disk) into the RAM 212, and executes the OS. As a result, the information processing apparatus 200 inputs various instructions from the user via the operating unit 26, can execute corresponding processing. Furthermore, under the control of the OS, the CPU 211 can execute an application program stored in advance in the auxiliary storage device 214. For example, depending on the type of the application program, the information processing apparatus 200 functions as the actual space information holding device 2, the image processing apparatus 3, the user terminal 4, or the marker output device 5. For example, when the information processing apparatus 200 functions as the image processing apparatus 3, the communication I/F 217 is communicatively connected to the network (for communication with the user terminal 4 and the marker output device 5), the image capturing device 1, and the actual space information holding device 2. When the information processing apparatus 200 functions as the marker output device 5, the network (for communication with the user terminal 4 and the marker output device) and a projector are connected to the communication I/F 217. When the information processing apparatus 200 functions as the actual space information holding device 2, after storing actual space information (described later in detail) in the auxiliary storage device 214, the information processing apparatus 200 is only required to function as a file server.

The image capturing device 1 is constituted by a plurality of cameras installed as surrounding an athletic field, a studio, or the like, and these cameras transmit, to the image processing apparatus 3, images obtained by synchronous image capturing with one another.

The actual space information holding device 2 holds information regarding a space in a predetermined range including the object (performer). Specifically, such information includes three-dimensional model information of an object (background object) appearing as a background in a virtual viewpoint image such as a field and an audience seat of a stadium or equipment and the like of a studio, and three-dimensional space information indicating a range in which a virtual viewpoint can be set, as well as an installation position, a capturing direction, and a focal length of each image capturing device 1. Since the information held in the actual space information holding device 2 is referred to when the image processing apparatus 3 generates a virtual viewpoint image, the information may be provided in the image processing apparatus 3.

The image processing apparatus 3 includes a virtual viewpoint image generating unit 301, a virtual-camera-path calculating unit 302, a virtual-camera-path information holding unit 303, a marker's coordinate calculating unit 304, a display image generating unit 305, and a communicating unit 306.

The virtual viewpoint image generating unit 301 generates a three-dimensional model of a foreground object based on a multiple-viewpoint image acquired from the image capturing device 1. Then, the virtual viewpoint image generating unit 301 maps a texture, which is matched with the virtual viewpoint acquired from the virtual-camera-path calculating unit 302, with respect to the generated foreground three-dimensional model and the background three-dimensional model acquired from the actual space information holding device 2, and performs rendering to generate a virtual viewpoint image. In the process of the generation, the virtual viewpoint image generating unit 301 calculates the coordinates of the foreground object and the background object appearing in the virtual viewpoint image to be generated, and executes texture mapping and rendering only for the coordinates. The virtual viewpoint image generating unit 301 passes this coordinate values to the virtual-camera-path information holding unit 303 described later as object foreground coordinates and actual space background coordinates.

The virtual-camera-path calculating unit 302 calculates virtual-camera-path parameters continuously in time based on user's instruction contents with respect to a virtual-camera-path instructing unit 403 of the user terminal 4. The virtual camera parameters are at least the position, orientation (gaze direction), and angle of view (focal length) of the virtual camera, and are associated with frame numbers or time codes imparted to the multi-view images so that the parameter of which moment in the captured scene can be specified. In this calculation, the virtual camera path is set in a range where the virtual viewpoint can be set with referring to the actual space information obtained from the actual space information holding unit 2.

The virtual-camera information holding unit 303 accumulates object foreground coordinates and actual space background coordinates received from the virtual viewpoint image generating unit 301, and virtual-camera-path parameters calculated by the virtual-camera-path calculating unit 302.

The marker's coordinate calculating unit 304 generates information regarding the coordinate parameter of the marker information to be displayed in the actual space based on the virtual camera parameters related to the virtual camera accumulated in the virtual-camera information holding unit 303 and the three-dimensional space information (background information) held by the actual space information holding unit 2.

The display image generating unit 305 generates a display image displayed on an image display unit 402 of the user terminal 4. The display image generated here is a virtual viewpoint image generated by the virtual viewpoint image generating unit 301. The virtual viewpoint image is an image representing a view from the virtual viewpoint.

The communicating unit 306 performs exchanges among the image processing apparatus 3, the user terminal 4, and the marker output device 5 via a network and the like that is not illustrated. The communicating unit 306 transmits and receives, between the image processing apparatus 3 and the user terminal 4, instruction information such as images, voices, text data, and virtual-camera-path instructions sent from the user side when generating a virtual viewpoint image. The communicating unit 306 transmits and receives, between the image processing apparatus 3 and the marker output device 5, display parameters such as coordinate information, marker shape, color, size, and display information necessary for marker display.

The user terminal 4 includes a communicating unit 401, the image display unit 402, a virtual-camera-path instructing unit 403, a user information transmitting unit 404, and a marker information transmitting unit 405.

The communicating unit 401 transmits and receives various information to and from the communicating unit 306 as described above. The image display unit 402 receives and displays the image generated by the display image generating unit 305. The virtual-camera-path instructing unit 403 receives an instruction with respect to a virtual camera path from the user and passes it to the virtual-camera-path calculating unit 302 via the communicating unit 401 and the communicating unit 306. Here, the user does not necessarily have to strictly instruct all of the virtual camera parameters for the entire time desired to view. For example, it is also possible to input instructions based on various points of view such as a desire to view a virtual viewpoint image focusing on a specific player or performer, a desire to constantly view a certain range surrounding the ball, and a desire to view a place where a more noteworthy event is taking place.

The user information transmitting unit 404 attaches user information including a user ID and the like to information transmitted from the communicating unit 401 to the communicating unit 306. The marker information transmitting unit 405 attaches marker style parameter information such as the type (including shape and color) of the marker to the information transmitted from the communicating unit 401 to the communicating unit 306.

The marker output device 5 includes a communicating unit 501, a control data generating unit 502, a marker controlling unit 503, and a display data outputting unit 504. The marker output device 5 displays (or presents) a recognizable marker to a person to be an object. The marker to be displayed is output for a position related to the virtual camera parameter. That is, the position of the marker is controlled by the marker output device 5 in conjunction with the virtual camera parameter.

As described above, the communicating unit 501 performs exchanges with the marker's coordinate calculating unit 304 and the user terminal 4 via the communicating unit 306 of the image processing apparatus 3, the network and the like.

The control data generating unit 502 integrates data, which is output from the virtual viewpoint image generating unit 301 and the marker's coordinate calculating unit 304, and data, which is output from the virtual-camera-path instructing unit 403 and the marker information transmitting unit 405, generates control data such as the style of the marker, the display update time, and the position coordinates, and outputs them to the marker controlling unit 503.

The marker controlling unit 503 converts the control data into display data (screen coordinate system) based on display parameters such as display position, size, shape, and display contents and the like of the marker, and outputs them to the display data outputting unit 504.

The display data outputting unit 504 is constituted with a display device such as a projector and outputs display data based on the output data of the marker controlling unit 503.

Figure 2A:
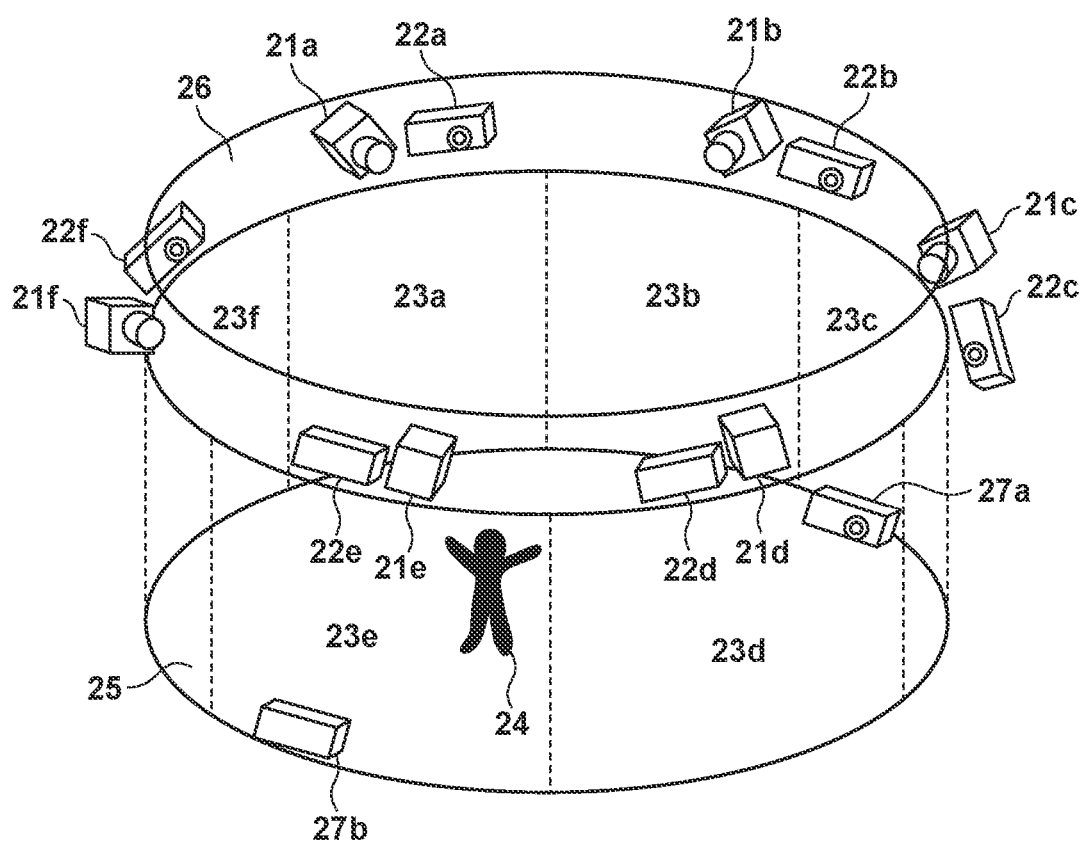
FIG. 2A is a configuration view in a space surrounding an object in the first embodiment.

FIG. 2A is a schematic view of a real space surrounding an object in the image processing system of the present embodiment. The image processing system in the present embodiment includes a plurality of cameras (image capturing device 1) as surrounding an actual space in a predetermined range including the object. The image processing system in the present embodiment also includes a projector (display data outputting unit 504) for displaying a marker recognizable by the object (human) at a position based on the virtual-camera-path information.

The image processing system in the figure is an example of a case where the present configuration is implemented in a circular studio, where cameras 21a to 21f, projectors 22a to 22f, and screens 23a to 23f are arranged as surrounding an object 24. The image processing apparatus 3 generates virtual viewpoint images from multi-view images acquired by the cameras 21a to 21f, and calculates coordinates on a screen on an extension line connecting the object 24 and the virtual viewpoint, as marker coordinates. The marker output device 5 receives the marker coordinates and displays the marker on the corresponding screen. Specifically, the display of the marker is projected onto the screen by the projectors 22a to 22f, and the projector 22a projects the display of the marker onto a front screen area 23e. Similarly, the projector 22b displays a marker in a screen area 23d, the projector 22c displays a marker in a screen area 23f, and the projector 22d displays a marker in a screen area 23b. The projector 22e displays a marker in a screen area 23a, and the projector 22f displays a marker in a screen area 23c. The projectors 22a to 22f are connected by a network, and the display data outputting unit 504 is configured to transmit display data to a projector to display. The screen is also provided on the floor surface and the top surface, and the projector 22b and the projector 22e perform projection onto a floor surface screen 25. Projectors 27a and 27b perform projection onto the top surface screen 26.

Figure 2B:
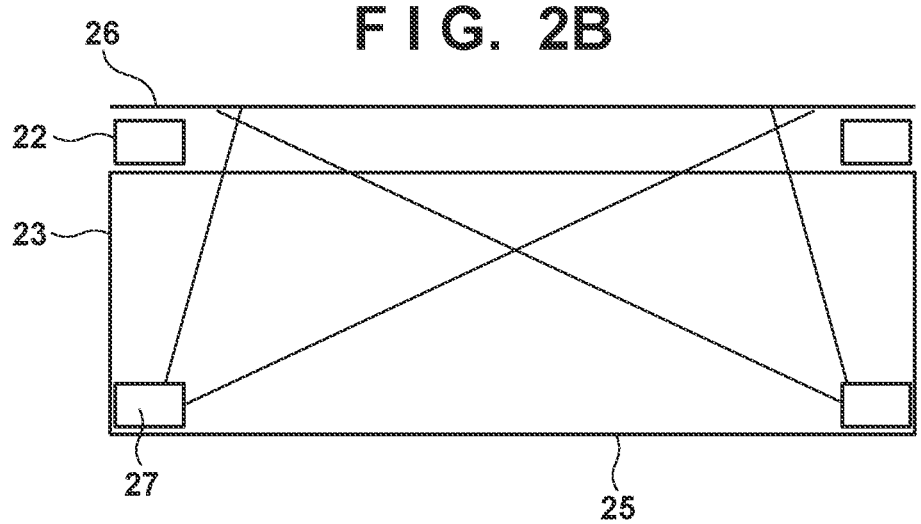
FIG. 2B is a view illustrating a part thereof.

FIG. 2B is a partial cross-sectional view of the circular studio of the present embodiment illustrated in FIG. 2A. As described above, the display of the marker is configured to be projected onto a screen by a projector. The projector 22 performs projection onto the screens 23 and 25 and the projector 27 projects a marker of a type set by the user onto the screen 26.

Figure 3A:
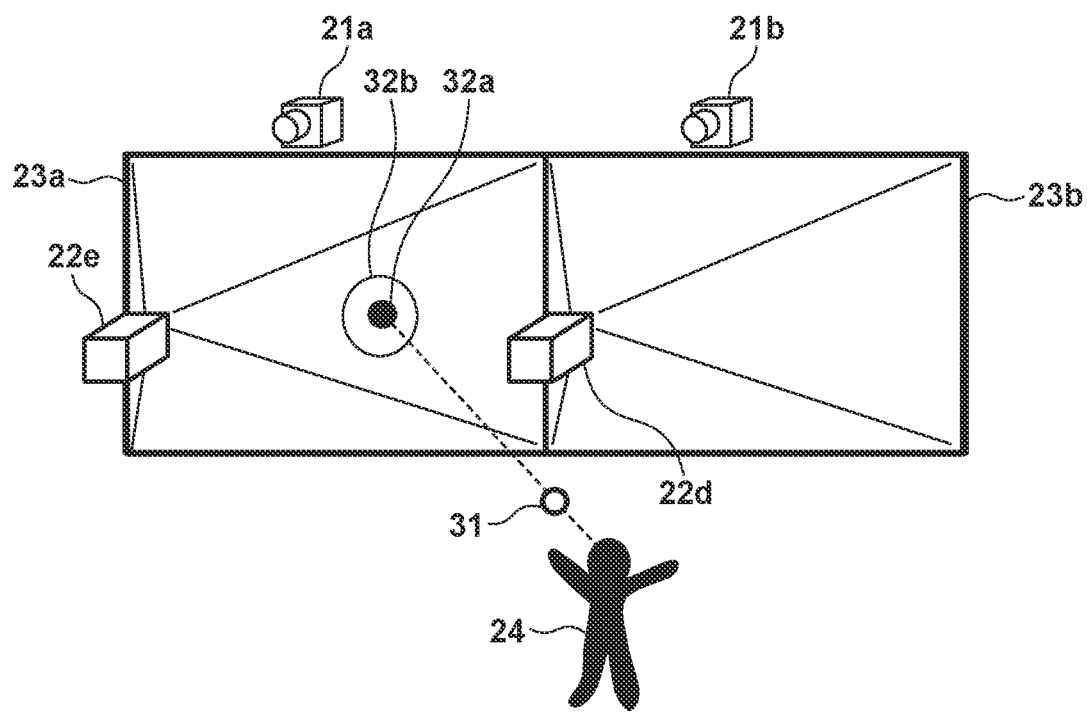
FIGS. 3A to 3E are explanatory views for explaining marker display.
Figure 3B:
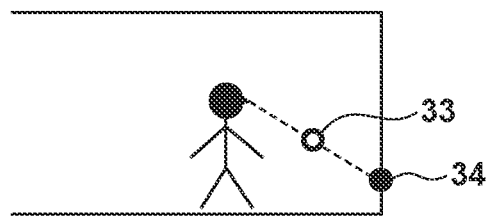
Figure 3C:
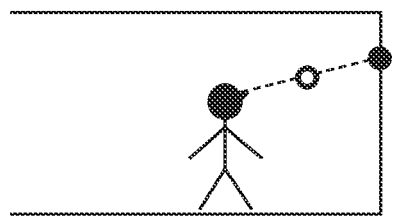
Figure 3D:
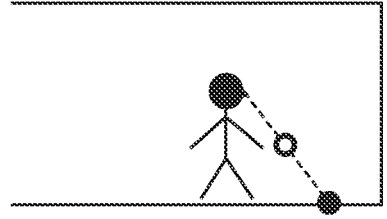
Figure 3E:
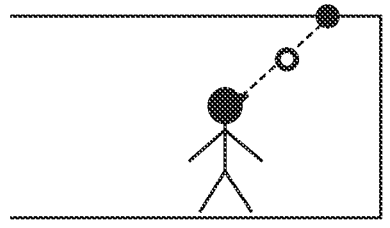

FIG. 3A is a view of a partial configuration extracted from the image processing system illustrated in FIG. 2A. A virtual viewpoint 31 indicates a virtual camera position when a certain virtual viewpoint image is generated. A marker 32a is projected by the projector 22e onto the screen area 23a. Since the object 24 cannot actually view the position of the virtual camera (virtual viewpoint 31), the object 24 views the projected marker 32a when the object 24 tries to align his/her line of sight with the virtual camera. The projection position of the marker 32a is controlled by the marker controlling unit 503 so that the projection position is on an extension formed by connecting the face (eye) of the object 24 and the virtual viewpoint 31. The distance from the face of the object to the virtual viewpoint 31 is represented by the size of the circle of a marker 32b. Thus, the position where the virtual viewpoint 31 exists between the marker projected onto the screen and the face of the object can be represented by the display form (here, the size) of the marker. For example, it can be realized by notifying in advance the object that the virtual camera is located close to the object when the circle is made large, and the virtual camera is located close to the marker when the circle is made small.

FIGS. 3B to 3E are views illustrating the positional relationship among the object, the virtual camera, and the marker, in which FIG. 3A is viewed from the side. In FIGS. 3B to 3E, a white circle 33 indicates a virtual viewpoint and a black circle 34 indicates a marker projected onto the screen. As illustrated in this figure, the face of the object, the virtual viewpoint, and the marker are arranged on a straight line. Since the screen is also provided on the floor surface and the top surface, as illustrated in FIGS. 3B to 3E, even when the virtual camera is with an angle from above or below the object, the object 24 can view straight at the virtual camera.

Figure 4:
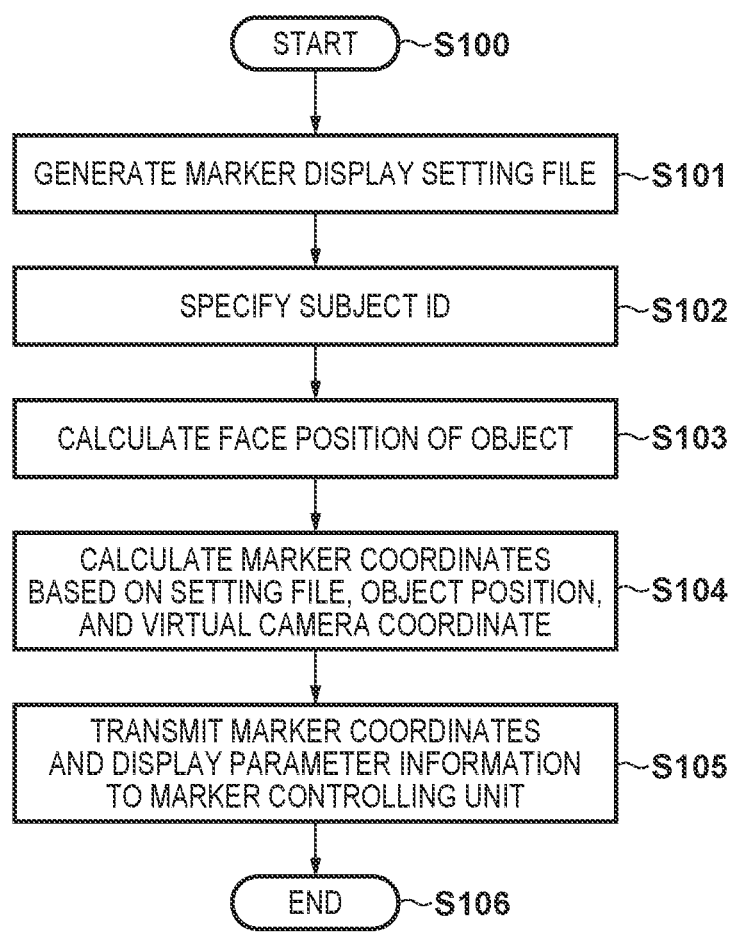
FIG. 4 is a flowchart illustrating marker display processing in the first embodiment.

FIG. 4 is a flowchart illustrating the processing of the control data generating unit 502 of the marker output device 5.

In S100, the control data generating unit 502 starts generation processing. In S101, the control data generating unit 502 generates a marker display setting file based on the data output from the marker information transmitting unit 405. This setting file includes information defining the style of the marker and the display parameters (color, shape, and so forth) of the marker.

In S102, the control data generating unit 502 counts the number of objects from the three-dimensional model of the object in the virtual viewpoint image output from the virtual viewpoint image generating unit 301, and imparts an object ID.

In S103, the control data generating unit 502 calculates the coordinates of the face of the object in the world coordinate system from the three-dimensional model information of the object. When there are a plurality of objects, the same processing is performed as many times as the number of objects. Identification of the face can be performed from the three-dimensional model of the object by using a general image processing technology from shape and feature points of the model.

In S104, the control data generating unit 502 calculates marker coordinates to be displayed based on the setting file, the object position (face coordinates), and the virtual camera coordinates. The calculation of the marker coordinates is executed in the world coordinate system, in which the marker coordinates intersecting the screen on the extension line of the face coordinates and the virtual camera coordinates are calculated. As a result, the screen used for projection and a projector used for projection are determined.

In S105, the control data generating unit 502 generates display parameter information from the setting file, and outputs it to the marker controlling unit 503 together with the marker coordinates.

As a result, the marker controlling unit 503 controls the display data outputting unit 504 to display the marker of the type set at the set position.

Since the marker to be displayed is a symbol indicating the direction in which the virtual viewpoint exists for the object, it may be an icon and the like representing the virtual viewpoint camera. In this case, the icon may be displayed in a size corresponding to the distance in the actual space between the object and the virtual viewpoint. As a result, the object can grasp not only the direction in which the virtual viewpoint exists but also the distance to the virtual viewpoint.

When there are a plurality of objects, by calculating marker coordinates for each object and displaying each with a different setting (color and shape), they can view straight at the same position. This can be achieved by notifying in advance each object of the setting of the marker. Furthermore, when a plurality of objects are constantly casting the eyes on the same position, there may be only one marker.

First Modification of First Embodiment

Figure 10:
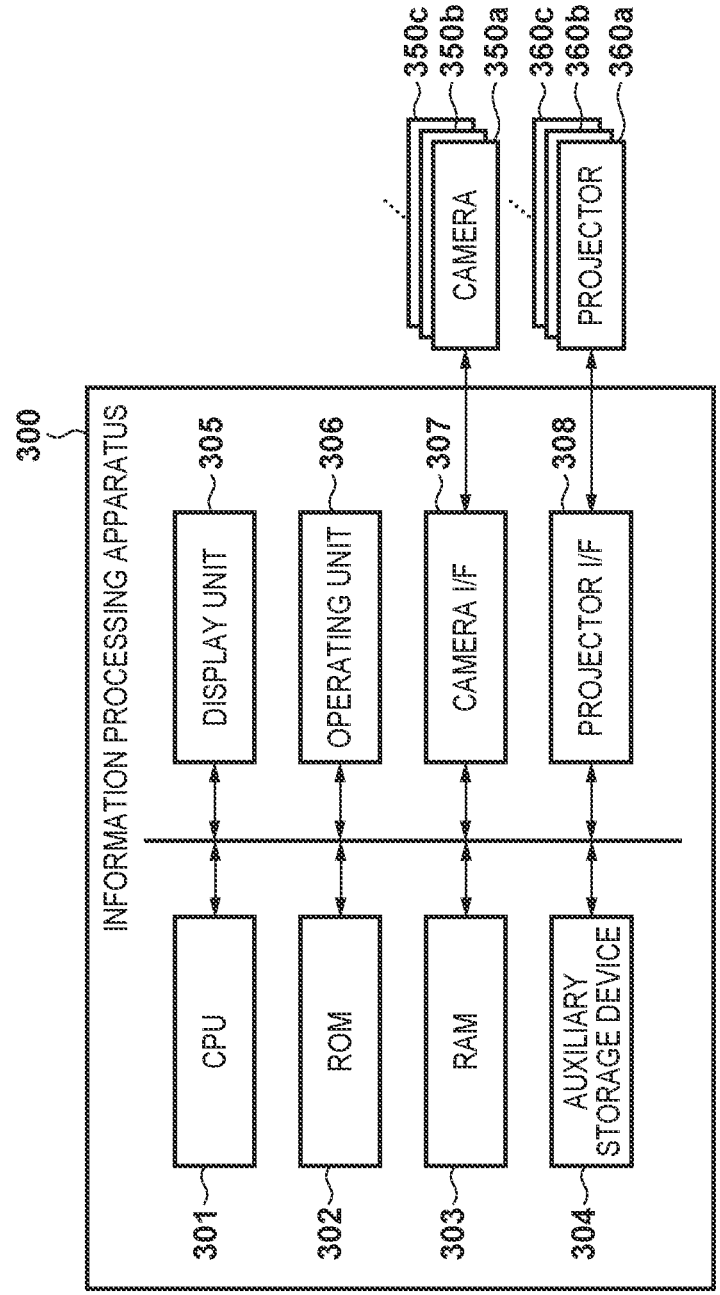
FIG. 10 is a view illustrating a hardware configuration of a device in a first modification of the first embodiment.

In the above embodiment, the image processing system has been described in which the actual space information holding device 2, the image processing apparatus 3, the user terminal 4, and the marker output device 5 are independent devices. However, when the processing performance is sufficient, these may be implemented by one information processing apparatus and an application program. FIG. 10 illustrates the configuration of the image processing system in this case. The image processing system is constituted by an information processing apparatus 300, a plurality of cameras 350a, 350b, . . . as the image capturing device 1, and a plurality of projectors 360a, 360b . . . as the display data outputting unit 504. The information processing apparatus 300 includes a CPU 301, a ROM 302, a RAM 303, an auxiliary storage device 304, a display device 305, an operating unit 306, a camera I/F 307, and a projector I/F 308. Here, the camera I/F 307 and the projector I/F 308 may be collectively implemented by one I/F. It is assumed that the auxiliary storage device 304 stores an OS, actual space information, and the like. In addition, the configuration relating to capturing and projection surrounding the object is the same as that of FIG. 2A.

When the present apparatus is powered on, the CPU 301 loads the OS stored in the auxiliary storage device 304 into the RAM 303 according to the boot program stored in the ROM 302 and executes the OS. As a result, the present apparatus functions as an apparatus that performs processing according to an instruction from the user. Furthermore, when the CPU 301 loads the image processing program from the auxiliary storage device 304 to the RAM 303 and executes it, the present apparatus functions as the virtual viewpoint image generating unit 301, the virtual-camera-path calculating unit 302, the virtual-camera information holding unit 303, the marker's coordinate calculating unit 304, the display image generating unit 305, the image display unit 402, the virtual-camera-path instructing unit 403, the user information transmitting unit 404, the marker information transmitting unit 405, the control data generating unit 502, and the marker controlling unit 503 in FIG. 1.

Figure 11:
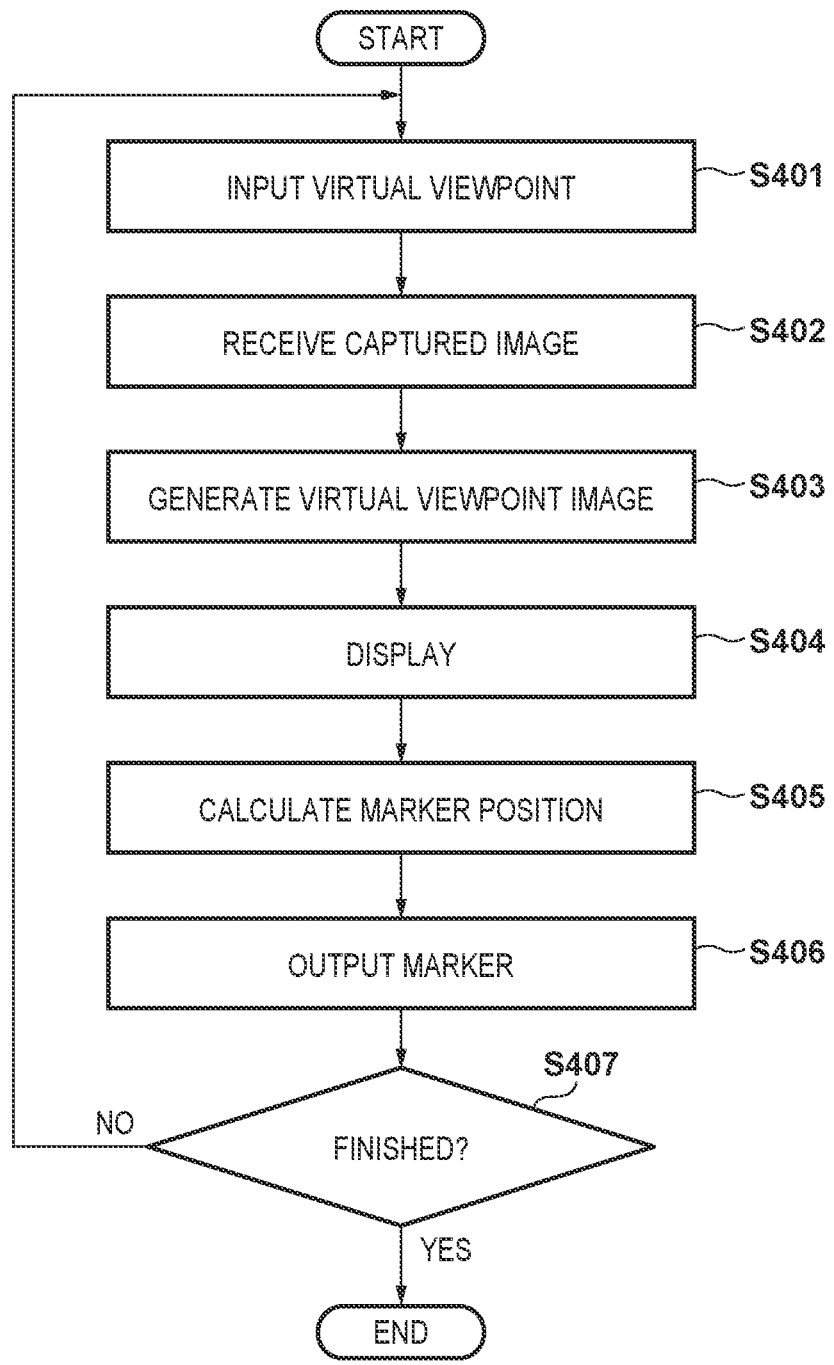
FIG. 11 is a flowchart illustrating a processing procedure in the first modification of the first embodiment.

The processing procedure w % ben the CPU 301 executes the image processing program will be described with reference to the flowchart of FIG. 11. In order to simplify the description, it is assumed that the information regarding the marker has already been set.

In S401, the CPU 301 inputs information related to the virtual viewpoint via the operating unit 306. This information includes coordinates of the virtual viewpoint in the actual space, a line-of-sight direction (a view direction) from the virtual viewpoint, and an angle of view.

In S402, the CPU 301 receives the captured image data from the cameras 350a, 350b, and . . . via the camera I/F 307. In S403, the CPU 301 generates the virtual viewpoint image with reference to the actual space information (in particular, information such as the installation position and direction of the camera) stored in the auxiliary storage device 304. In S404, the CPU 301 displays the generated virtual viewpoint image on the display device 305.

In S405, the CPU 301 calculates, as a marker display position, an intersection position between a line, which is connecting the coordinates of the face of the object and the coordinates of the virtual viewpoint, and the screen surface in the actual space. In S406, the CPU 301 causes, via the projector IF 308, the projector having the calculated marker display position as a projection target to display the marker at the marker position.

Thereafter, in S407, the CPU 301 determines whether or not an instruction to terminate the application has been issued by the user, and if not, returns the processing to S401 to repeat the above processing.

In this modification, the actual space information holding device 2, the image processing apparatus 3, the user terminal 4, and the marker output device 5 are integrated with the information processing apparatus illustrated in FIG. 10, but some of them may be independent devices.

Furthermore, when a virtual viewpoint image of motion of the performer is generated in a movie or the like, it is easier also for the performer to perform with realistic sensations, and therefore each projector may display not only a marker but also surrounding scenery around the performer.

The presentation position of the marker may be determined independently of the virtual viewpoint. In particular, the position of the marker is only required to be a position at which the object casts the eyes, and may be designated by the user, for example.

Second Modification of First Embodiment

Figure 12:
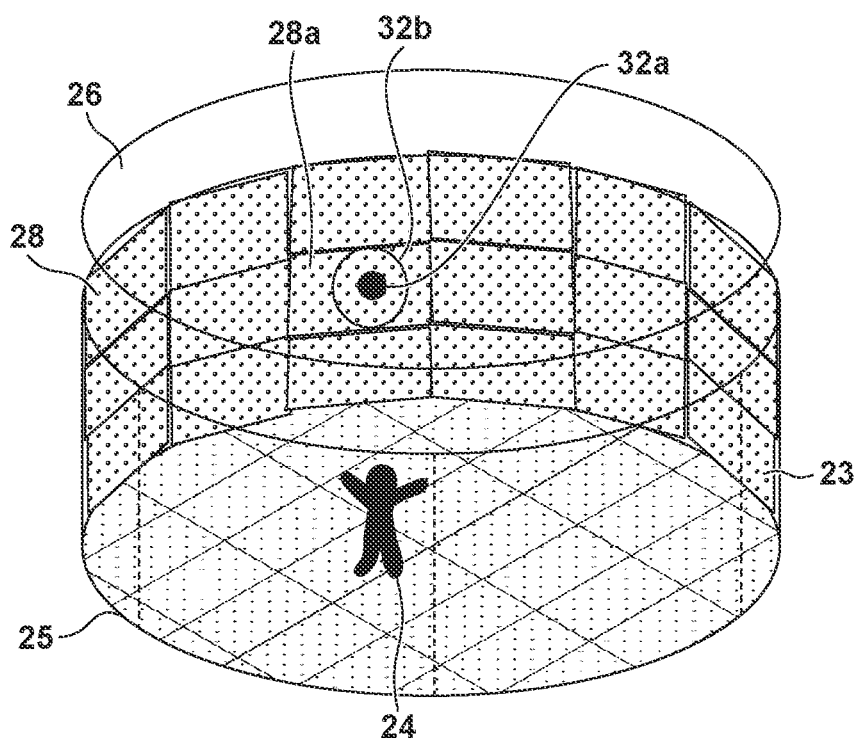
FIG. 12 is a view illustrating a configuration and a part thereof in a space surrounding an object in a second modification of the first embodiment.

In the above embodiment, the marker is displayed by being projected from the projector onto the screen, but the configuration of the display data outputting unit 504 is not limited thereto. As illustrated in FIG. 12, a plurality of liquid crystal displays may be installed as covering the surfaces of screens 23, 25, 26, and 28. In this case, in S104, the control data generating unit 502 determines a display 28a corresponding to the marker coordinates calculated in the world coordinate system, and calculates the display coordinates on the display screen based on the position and orientation of the display 28a having been calibrated in advance. Calibration of the display can be performed with the three-dimensional coordinates of the marker displayed on the display being calculated by triangulation using the cameras 21a to 21f and being associated with the coordinates of the marker on the display. In S105, the marker controlling unit 503 controls the display data outputting unit 504 to display the marker 32 of the type set to the display coordinates on the corresponding display 28a. Screens other than the marker display coordinates on the display and other screens on the display on which the markers are not projected may inconspicuously display the screen colors or may display the surrounding scenery around the performer.

Third Modification of First Embodiment

Figure 13A:
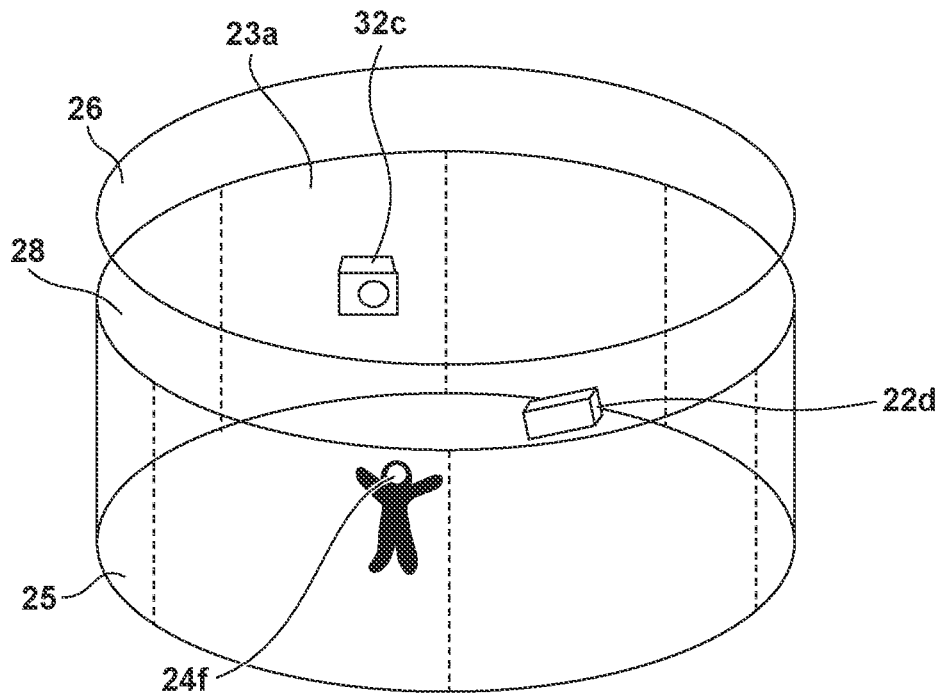
FIGS. 13A and 13B are respective views illustrating a configuration and a part thereof in a space surrounding an object in a third modification and a fourth modification of the first embodiment.

In the first embodiment, the direction in which the virtual viewpoint exists is displayed using a point marker, but a three-dimensional model of the virtual camera may be projected onto the screen to further indicate the attitude of the virtual camera. At this time, the three-dimensional model of the virtual camera is stored in advance in the auxiliary storage device 214 and deployed into the RAM 212 when the application program is executed. The style of marker is a virtual camera three-dimensional model. FIG. 13A illustrates a state of projecting a three-dimensional model of a virtual camera. In S405, the CPU 301 virtually projects the three-dimensional model of the virtual camera from a coordinate 24f of the face of the object in the actual space towards the screen 23a, and calculates the three-dimensional coordinates of an image 32c thereof. An image of a marker to be displayed on the projector 22d is generated by back-projecting the three-dimensional coordinates of the image 32c towards the projector 22d. The virtual camera three-dimensional model may have any shape, texture, and transparency, and may be a model of a three-dimensional arrow instead of a camera.

Thus, the object can recognize the attitude of the virtual viewpoint in addition to the direction in which the virtual viewpoint exists.

Fourth Modification of First Embodiment

Figure 13B:
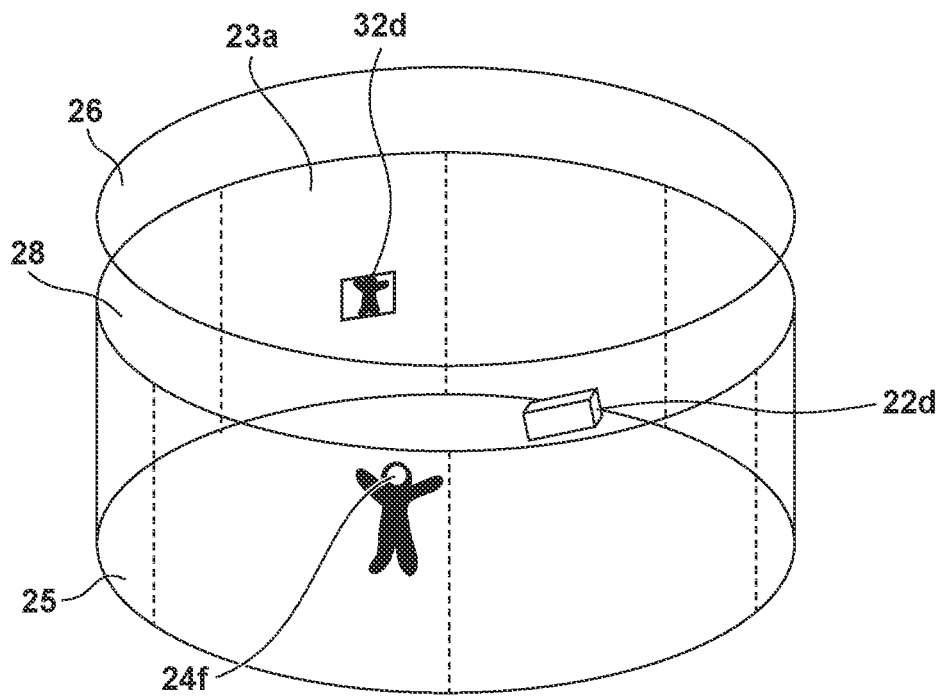

In the above embodiment, the direction in which the virtual viewpoint exists and attitude are displayed using a point or a three-dimensional model, but a virtual viewpoint image may be displayed in order to indicate the angle of view of the virtual viewpoint. At this time, the display image generating unit 305 transmits the virtual viewpoint image generated immediately before to the projector or the display. The style of marker is a virtual viewpoint image. FIG. 13B illustrates a state of projecting the virtual viewpoint image. In S104, the control data generating unit 502 calculates the marker coordinates on the screen or the display, and performs projection transformation on the virtual viewpoint image so that the marker coordinates are centered and the object can view straight at the virtual viewpoint image. The projection transformation uses affine transformation or homography transformation. In S105, the marker controlling unit 503 controls the display data outputting unit 504 and projects the virtual viewpoint image 32d having undergone projection transformation onto the display coordinates on the corresponding screen or display.

This allows the object to recognize, by viewing the virtual viewpoint image, the direction in which the virtual viewpoint exists, the angle of view at the virtual viewpoint, and condition of image taken from the virtual viewpoint. The user may change the display setting of the marker as necessary to invert the virtual viewpoint image in a left and right direction and display the virtual viewpoint image as if the object itself appears in a mirror.

Fifth Modification of First Embodiment

When there are a very large number of virtual viewpoints such as 10 or more and a plurality of fast moving virtual viewpoints, displaying the marker as it is may appear cumbersome to the object. In this modification, virtual viewpoints close to each other are collectively displayed, and markers of fast moving virtual viewpoints are displayed to be difficult to view.

Figure 14:
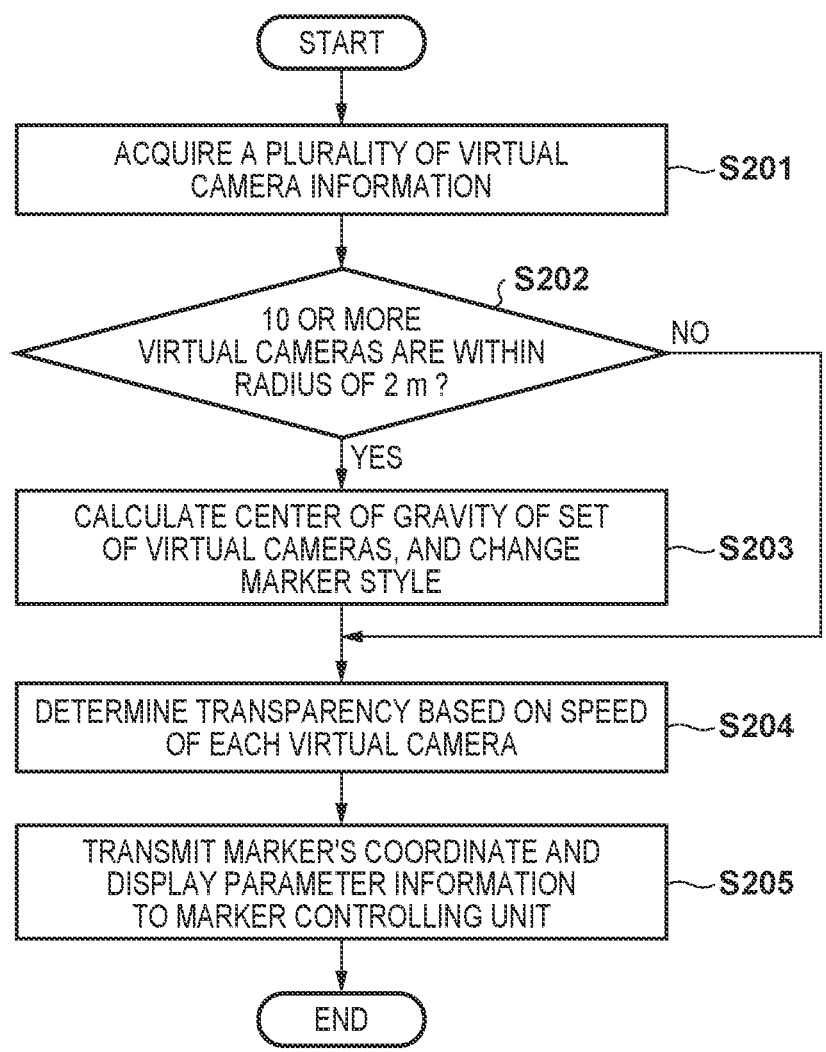
FIG. 14 is a flowchart illustrating a processing procedure in a fifth modification of the first embodiment.

The virtual-camera information holding unit 303 transmits a plurality of virtual camera paths in the identical time code to a marker's coordinate calculating unit 304. FIG. 14 illustrates a change processing flow of the marker display in the marker's coordinate calculating unit 304. In S201, a plurality of coordinates and speeds are acquired as virtual camera information. In S202, a distance threshold (radius 2 m) and a quantity threshold (=10) described in the display setting of the marker are acquired, and it is determined whether or not there are 10 or more received virtual cameras within 2 m of each other. If No, the processing proceeds to S204. If Yes, the center of gravity of the set of virtual cameras existing within 2 m of each other is determined in S203 as a representative point, and the marker is displayed only for the representative point. At this time, the color or marker style may be changed in order to indicate that it is a representative point, or the number of elements of the set may be displayed in text. In S204, based on the minimum speed threshold (2 m/s), the maximum speed threshold (10 m/s), and the maximum transparency (90%) described in the display setting of the marker, the transparency of the virtual camera at speeds of 2 to 10 m/s is linearly changed and determined. The transparency is 0% at 0 to 2 m/s and the transparency is 90% at 10 m/s or more. The determination method of the transparency is not limited to this. In addition, the marker display may be changed by changing the brightness, saturation, and the like in addition to the transparency so that the faster the speed of the virtual camera is, the more difficult it is viewed.

Thus, the object can concentrate on the performance even when the number of virtual viewpoints is large.

In addition, as an effect of this modification, when there is a delay from the capturing of the object to the display of the marker, the positional deviation due to the delay of the quickly moving virtual camera is made difficult to be viewed by the transparency of the marker. The virtual camera that does not move quickly has relatively less positional deviation due to delay, and can be easily viewed without transparency.

Second Embodiment

In the above-described first embodiment and its modification, the position of the marker viewed by the object is configured such that the object views (line of sight) straight at the position of the virtual camera among the virtual camera parameters. The content expressed by the marker is not limited to that described above.

In the second embodiment, the marker to be displayed is related to the virtual camera parameter, but the marker indicates a position at which the object desires to view straight (a position at which the object desires to cast his/her eyes), instead of viewing straight at the virtual camera. Such configuration enables a scene of line of sight directed by the object to the marker to be generated as a video captured by the virtual camera.

Figure 5A:
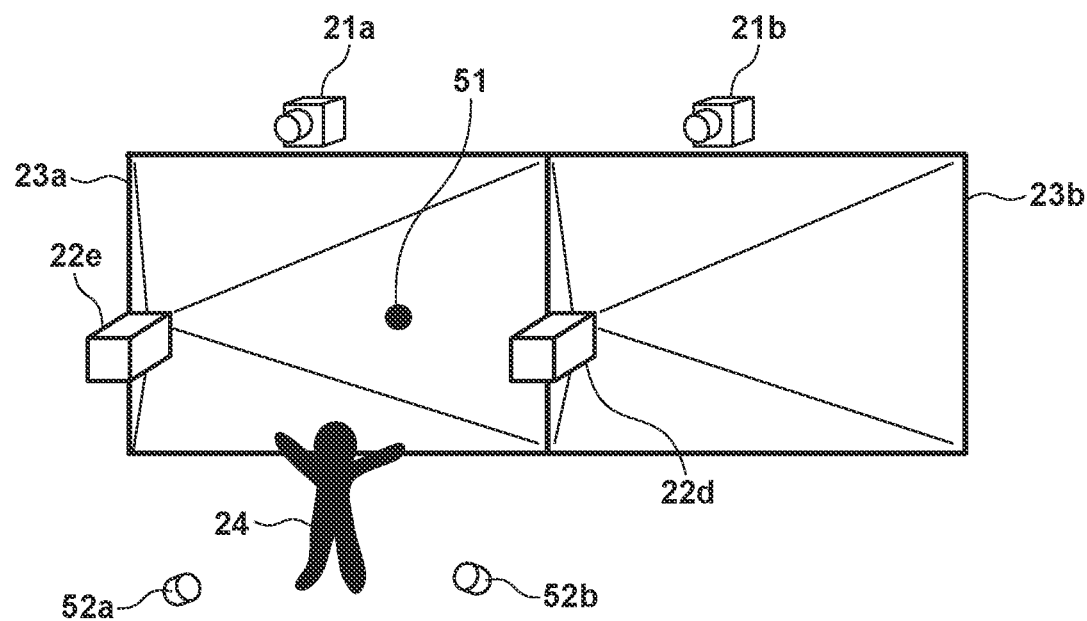
FIGS. 5A and 5B are explanatory views for explaining the marker display processing in a second embodiment.

FIG. 5A is a view for explaining the present embodiment. As described above, a marker 51 in the figure indicates the position at which the object desires to view straight (a position at which the object is desired to view straight). The type of marker in the present embodiment is different from that in the first embodiment. Therefore, the type of marker is switched by the marker style parameter information transmitted by the marker information transmitting unit 405 of the user terminal 4.

Reference numerals 52a and 52b in the figure denote virtual cameras. Although the object 24 cannot actually view them, it is possible to generate a video in which the virtual camera captures a video with the line of sight viewing straight at the marker 51.

Figure 5B:
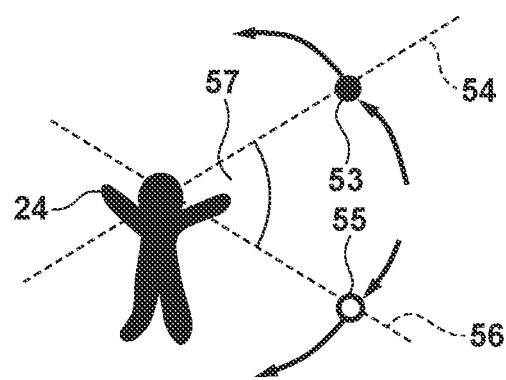

FIG. 5B is a view schematically illustrating the positional relationship between the virtual camera and the marker. The positional relationship between the virtual camera and the marker in the present embodiment is defined in advance as a setting file in the marker information transmitting unit 405. In the setting file, for example, it is defined such that a line, which is an extension line of a virtual camera path 55 and the face of the object, and a line, which is an extension line of a corresponding marker 53 and the face of the object, form an angle 57. Thus, it is possible to create a free viewpoint video with the video of the object casting the line of sight at a certain target as a video from various angles.

Third Embodiment

In the first embodiment, the modification, and the second embodiment, the marker is configured to be visually recognizable to the object by being projected onto the screen by the projector. However, in the case of generating a free viewpoint video at a temporary studio or a capturing location, a case in which it is not always possible to provide a screen is conceivable. Therefore, in the present embodiment, it is configured such that an indicator is prepared in a mounting member on which the camera is mounted so that the object recognizes the position of the virtual camera by the manner of displaying the indicator.

Figure 6:
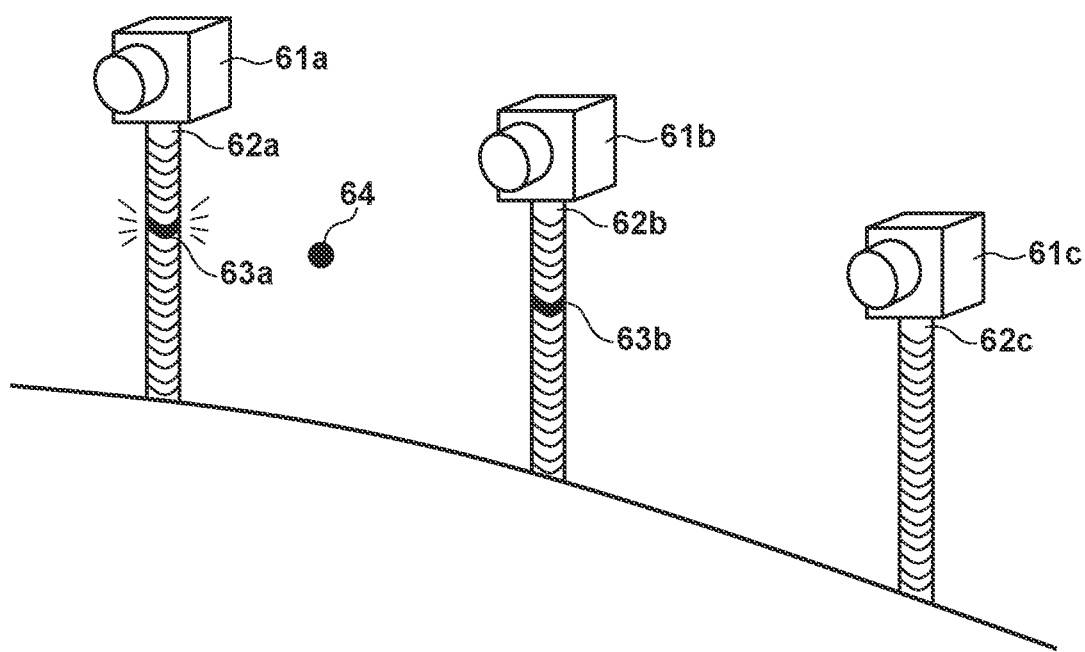
FIG. 6 is a view for explaining a configuration for marker display in a third embodiment.

The third embodiment will be described with reference to FIG. 6. Cameras 61a to 61c are mounted on mounting members 62a to 62c arranged as surrounding the object in the actual space. These mounting members are provided with indicators, and the lighting position in the height direction, the blinking speed, the display color, and the like are controlled by the marker controlling unit 503. Reference numeral 64 in the figure denotes the position of the virtual camera, and the object cannot directly view it. However, the object can recognize the approximate position of the virtual camera by display of the indicator. For example, when indicators 63a and 63b are now lighted, it can be recognized that the position of the virtual camera is between the actual cameras 61a and 61b and approximately at the height of the indicator. Furthermore, when the indicator 63a blinks, it can be recognized that the position of the virtual camera is close to the actual camera 61a.

Thus, by providing the indicator on the mounting member of the actual camera, it can be configured such that the object can recognize the approximate virtual camera position.

In employing the third embodiment, the marker output device 5 in FIG. 1 controls the display of the indicator.

Fourth Embodiment

In the above-described embodiments (including modifications), the presentation of the marker is represented by a marker two-dimensionally displaying the position of the virtual camera in the actual space. In the present embodiment, a configuration of three dimensionally presenting, that is, presenting the position of the virtual camera itself as visually recognizable to the object will be described.

As the marker in the fourth embodiment, for example, a flying device, which is capable of autonomous flying, having a hovering function such as a drone is used. The marker of the present embodiment may be anything as long as it is powered, configured to fly, and configured to control a coordinate value. That is, the marker of the present embodiment receives the virtual camera position coordinates output by the marker controlling unit 503 as the world coordinate values of the actual space, and flies to the position. The plurality of markers may be provided.

Figure 7:
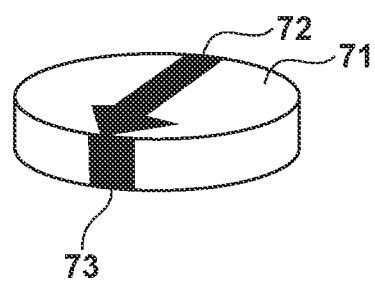
FIG. 7 is a view for explaining a configuration that presents a marker in a fourth embodiment.

For example, as illustrated in FIG. 7, the marker is configured such that a flying object 71 includes a mark (arrow display 72 and side marking 73 in the figure) for indicating the line-of-sight direction (a view direction) of the virtual camera.

With this configuration, the object can recognize the position of the virtual camera. If there are a plurality of markers and a free viewpoint video is generated, the marker sometimes enters the angle of view of the virtual camera. However, since the position of the virtual camera and the shape of the marker are known in advance, it is possible to generate a free viewpoint video by eliminating the marker in a video. At this time, the coordinates of the marker are projected to each of the cameras 21, and the projected coordinates on the camera video are excluded from model generation and rendering processing, thereby preventing the image of the marker from affecting model generation and rendering. Alternatively, the area to be the target of the position may be erased by smoothing and synthesizing with the same texture as the surrounding area, or may be erased by displaying a marker in the same color as the background in advance.

Modification of Fourth Embodiment

In the fourth embodiment described above, a drone is used, but the position and attitude of the virtual camera may be displayed using another device that can display three-dimensionally. Such devices include an aerial display that makes air emit light by exciting plasma, an anaglyph, a 3D display of a polarization light shutter system, and a spectacle type or contact lens type device such as a hololens that can perform AR display. Each can project the three-dimensional model of the marker onto the coordinates of the right and left eyes of the object in the virtual space, and a video for displaying by each device is generated, whereby the virtual camera can be three-dimensionally displayed to the object. In addition, if there are a plurality of virtual cameras, a marker to be displayed for each device may be controlled to facilitate recognition of a specific virtual camera for each object.

This allows the object to three-dimensionally view the position and attitude of the virtual camera while avoiding the risk of contact with the drone.

Fifth Embodiment

In the embodiments described above, the marker indicates information related to the line of sight of the object. When the object performs in the actual space, there is a case where the line of sight does not necessarily need to be viewing straight at something. In this case, when the object stands at a certain position in the actual space and performs a program, there is a case where the object is desired to recognize the standing position. In the fifth embodiment, the display of the marker is projected onto the floor surface. The object can recognize the standing position linked with the virtual camera based on the contents displayed on the floor surface.

Figure 8:
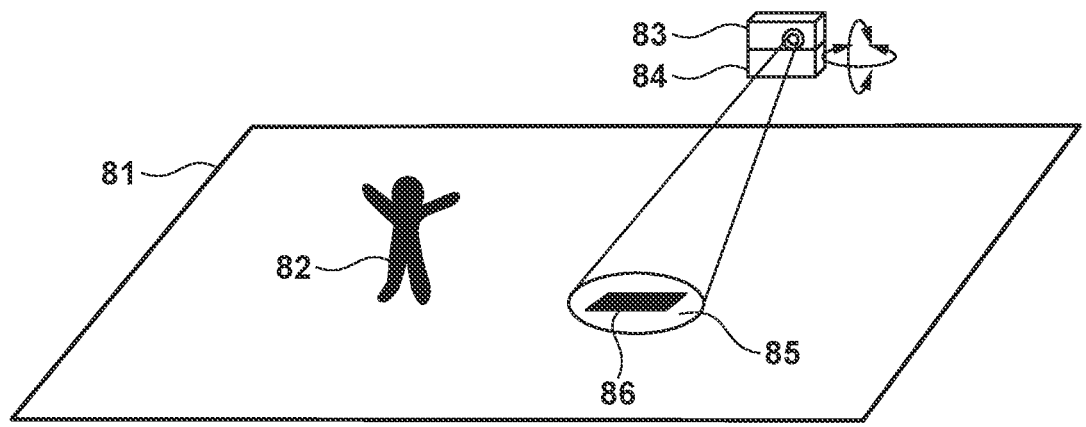
FIG. 8 is a view for explaining a presentation method of a marker in a fifth embodiment.

The configuration of the present embodiment is illustrated in FIG. 8. A projector 83 is configured to be mounted to a free camera platform 84, and the projection position can be controlled by a pan angle, a tilt angle, and a zoom magnification. As a display content 86, a standing position, a moving direction, and the like are displayed. In addition, regarding the display position and display contents of the marker, the virtual camera position and the marker position are controlled by the setting file defined by the marker information transmitting unit 405. This configuration makes it possible to generate, for example, a free viewpoint video in which a virtual camera captures a scene of moving from one standing position to another standing position.

In the above-described embodiments, a configuration is that the object visually recognizes the position of the marker at the time of capturing, but the present invention is not necessarily limited to such the configuration. For example, as described above, it is not limited to the configuration used only at the time of capturing, by superimposing the marker position also on an archive video, the display may be such that the relationship between the virtual camera and the line of sight is recognized on the viewing side.

The above can be achieved by preparing a plurality of streams for each virtual viewpoint. Furthermore, by preparing a video of bird's-eye view of the actual space and configuring the position of the marker to be interactive, the user can switch the camera position and refer to the free viewpoint video.

In a case where an image captured by a plurality of cameras is held as an archive video and an operator generates a free viewpoint video later, a face position (line of sight) of the object may be detected and a marker may be displayed at a position on the extension line in the virtual space. With this configuration, the operability of the operator is improved when the angle of view of the free viewpoint video is determined.

In addition, since the marker in the embodiments described above naturally appears in the image captured by each camera, there is a possibility that the marker becomes an obstacle in the free viewpoint video to be generated. However, since the display position, color, shape, and the like of the marker are known in the virtual space, it is possible to erase the area to be the target of the position by smoothing and synthesizing with the same texture as the surrounding area. It is also possible to solve the problem simply by displaying the marker in the same color as the background in advance as described above.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-156622, filed Sep. 17, 2020, and 2021-075358, filed Apr. 27, 2021, which are hereby incorporated by reference herein in their entirety.

What is claimed is:

1. A processing system comprising:
   a plurality of image capturing units configured to capture a space including an object and configured to be used for generating a virtual viewpoint image representing a view from a virtual viewpoint;
   a processor; and
   a memory, including instructions stored thereon, which when executed by the processor cause the system to:
   perform presentation for determining an orientation of the object in the space,
   wherein the plurality of image capturing units and a screen for projection are arranged as surrounding the object,
   project information, onto the screen, for determining the orientation of the object; and
   project information, at a position of an intersection between the screen and a line that is deviated in a predetermined direction with respect to an extension line connecting the object and the virtual viewpoint, for determining the orientation of the object.

2. The system according to claim 1, further comprising:
a specifying unit configured to specify a position of the virtual viewpoint,
wherein the presenting unit performs presentation for determining the orientation of the object in the space based on the position of the virtual viewpoint specified by the specifying unit.

3. The system according to claim 1 wherein the instructions, when executed by the processor, further cause the system to project information, at a position of an intersection between the screen and an extension line that is connecting the object and the virtual viewpoint, for determining the orientation of the object.

4. The system according to claim 1, wherein the instructions, when executed by the processor, further cause the system to present information, in a size corresponding to a distance between the object and the virtual viewpoint, for determining the orientation of the object.

5. The system according to claim 1,
wherein the plurality of image capturing units are attached to a mounting member including an indicator configured to light a position that is set with respect to a position in a height direction, and are arranged as surrounding the object,
wherein the instructions, when executed by the processor, further cause the system to light a position at which the object is prompted to cast the eyes.

6. The system according to claim 1, wherein the instructions, when executed by the processor, further cause the system to position a flying device at a position at which the object is prompted to cast the eyes.

7. The system according to claim 6, wherein the flying device is provided with a mark indicating a view direction of the virtual viewpoint.

8. The system according to claim 1, wherein the instructions, when executed by the processor, further cause the system to control pan and tilt angles of a projector mounted on a mounting member that can control a pan angle and a tilt angle, and the instructions, when executed by the processor, further cause the system to project information, onto a floor corresponding to a position at which the object is prompted to cast the eyes, for determining the orientation of the object.

9. The system according to claim 1, wherein the instructions, when executed by the processor, further cause the system to present information, at a position of the virtual viewpoint, for determining the orientation of the object.

10. The system according to claim 1, wherein the instructions, when executed by the processor, further cause the system to present information, at a position different from a position of the virtual viewpoint, the position in a direction in which the object is oriented, for determining the orientation of the object.

11. The system according to claim 1, wherein the orientation of the object is an orientation of a face of a person who is the object.

12. The system according to claim 1, wherein the orientation of the object is an orientation of casting the eyes of a person who is the object.

13. The system according to claim 1, further comprising:
a user terminal configured to designate the virtual viewpoint and a display unit configured to display the virtual viewpoint image;
an image processing apparatus configured to generate the virtual viewpoint image; and
a presenting device.

14. The system according to claim 1, wherein the instructions, when executed by the processor, further cause the system to present a virtual viewpoint image.

15. The system according to claim 1, wherein the instructions, when executed by the processor, further cause the system to control a color or shape according to the number or speed of virtual viewpoints.

16. A processing method comprising:
capturing a space including an object by a plurality of image capturing units configured to be used for generating a virtual viewpoint image representing a view from a virtual viewpoint;
performing presentation for determining an orientation of the object in the space;
projecting information, onto the screen, for determining the orientation of the object; and
projecting information, at a position of an intersection between the screen and a line that is deviated in a predetermined direction with respect to an extension line connecting the object and the virtual viewpoint, for determining the orientation of the object.

17. A non-transitory computer readable storage medium storing computer executable instructions for causing a computer to execute a processing method comprising:
capturing a space including an object by a plurality of image capturing units configured to be used for generating a virtual viewpoint image representing a view from a virtual viewpoint;
performing presentation for determining an orientation of the object in the space;
projecting information, onto the screen, for determining the orientation of the object; and
projecting information, at a position of an intersection between the screen and a line that is deviated in a predetermined direction with respect to an extension line connecting the object and the virtual viewpoint, for determining the orientation of the object.

* * * * *